United States Patent [19]

Winter

[11] 4,256,319
[45] Mar. 17, 1981

[54] TOBOGGAN

[76] Inventor: Richard D. Winter, 10237 Park, Bellflower, Calif. 90706

[21] Appl. No.: 74,491

[22] Filed: Sep. 11, 1979

[51] Int. Cl.³ .................... B62B 15/00; B62B 17/08
[52] U.S. Cl. ............................................ 280/18; 188/8;
   280/12 AA; 280/21 R
[58] Field of Search .......... 280/12 AA, 12 AB, 12 R,
   280/18, 19, 21 R, 16, 87.01; 188/8

[56] References Cited

U.S. PATENT DOCUMENTS

| | | | |
|---|---|---|---|
| 32,351 | 5/1861 | Clark | 188/8 |
| 1,568,493 | 1/1926 | Allen | 280/18 |
| 2,241,733 | 5/1941 | Perry | 280/21 R |
| 2,677,551 | 5/1954 | Berg | 280/18 |
| 3,579,682 | 5/1971 | Wood | 280/18 |
| 3,948,536 | 4/1976 | Konrad | 280/18 |

FOREIGN PATENT DOCUMENTS

| | | | |
|---|---|---|---|
| 820681 | 11/1937 | France | 280/12 AA |
| 70437 | 5/1959 | France | 280/12 AA |
| 6338 | 3/1895 | Sweden | 280/12 AA |
| 23550 | of 1913 | United Kingdom | 280/21 R |

Primary Examiner—David M. Mitchell

Attorney, Agent, or Firm—Dominick Nardelli

[57] ABSTRACT

A snow toboggan, or a flat bottomed sled, has a body with a curved forward portion. At its aft end, the sled is outfitted with a pair of hinged drag panels, each hinged independently to the body of the sled. On the underside of each panel is disposed one or more spikes which are capable of digging into the snow. Also on the underside of the body near its aft end is fixed a longitudinally oriented fin which is used to stabilize the forward motion of the sled. On the underside of the curved portion of the body is pivotably supported a pair of front stabilizing fins which are used to stabilize the sled when the sled is travelling across a hill or traversing a hill, to prevent the forward end from sliding down the hill. When not needed, these front stabilizing fins are rotated up out of the snow so that sharp turns can be maneuvered. Sharp turns are obtained by lowering one panel at a time by suitable means mounted in the body to allow the spikes thereunder to grip into the snow. If both panels are lowered into the snow, the toboggan can stop or slow down. Suitable means are included to connect the panel to a respective foot-operated pedal disposed near the forward portion of the sled.

9 Claims, 5 Drawing Figures

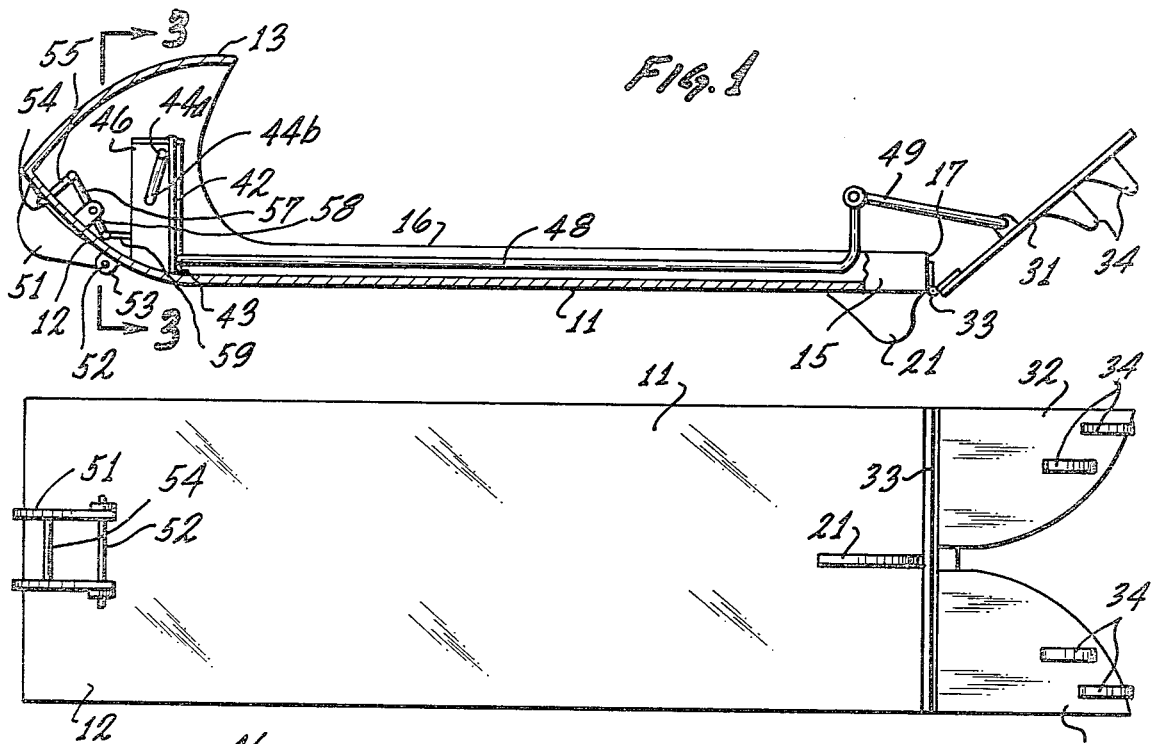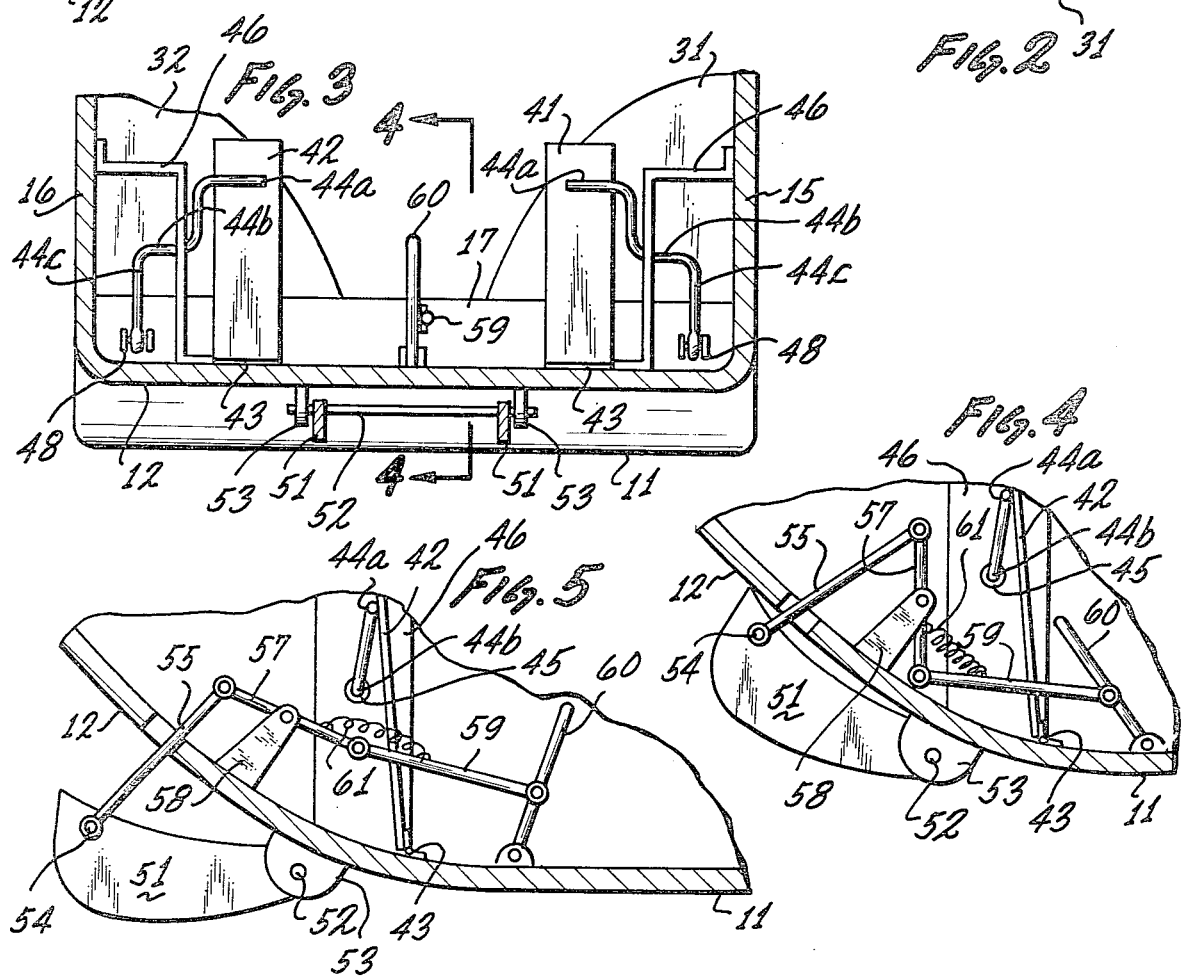

TOBOGGAN

FIELD OF THE INVENTION

This invention relates to a toboggan and, more particularly, to a steering means for a toboggan.

BACKGROUND OF THE INVENTION

Many types of sleds and toboggans have been designed, as taught in the following U.S. Pat. Nos. 2,241,733; 2,677,551; 3,579,682; and 3,807,749, and each one has a different means for steering the device. Although the prior art steering means are capable of allowing one to steer the toboggan, one finds that the radius of the turn is somewhat limited. In other words, the radius of the curvature of the track is relatively large. In addition, these prior art sleds did not allow a person to turn the sled readily so that it traverses a hill, i.e., did not allow the sled to travel along a contour line or path being at the same elevation.

OBJECTS OF THE INVENTION

An object of this invention is to provide a toboggan that has more effective and efficient steering means.

Another object of this invention is to provide a toboggan that has equal versatility in its downhill mode as well as the traverse mode of sledding.

Another object of this invention is to provide a toboggan wherein steering is capable of being performed while the operator is in a sitting position and with his feet or hands.

Another object of this invention is to provide a toboggan with a pair of snow drags positioned at the aft end, one on each side, and each drag is capable of being independently moved into the snow to allow one to steer and stop the sled.

These and other objects and features of advantage will become more apparent after one studies the following detailed description of the preferred embodiment of the invention, together with the appended drawing.

BRIEF DESCRIPTION OF THE DRAWING

FIG. 1 is a left side elevation of the toboggan, in partial section, the right side thereof being similarly shaped.

FIG. 2 is a bottom view of the toboggan shown in FIG. 1, and showing the surface which contacts the snow, with the drag panels rotated in the plane of the surface.

FIG. 3 is a partial section of the toboggan taken on line 3—3 in the direction of the arrows of FIG. 1, showing the lower portion of the sled.

FIG. 4 is a partial section taken on lines 4—4 in the direction of the arrows of FIG. 3, showing the front stabilizing fins in the raised position.

FIG. 5 is a partial section similar to FIG. 4, but showing the front stabilizing fins in the lowered position to cut into the snow.

DETAILED DESCRIPTION OF THE DRAWING

The toboggan has a body with a flat surface bottom 11 with a curved portion 12 at its forward end, as is standard in the art. Over the portion 12 is provided a cover 13 which extends rearward a relatively short distance of the length of the body. The body also has a pair of side rails, rail 15 on the left and rail 16 on the right, with an aft rail 17 connecting the rails 15 and 16 at the aft end. Rails 15 and 16 at the forward end are shaped as shown and fixed to portion 12 and cover 13. This construction of the toboggan provides a somewhat rigid box-like construction with a streamlined front to allow for easy coasting in the snow. To provide for longitudinal stability, a rear stabilizer fin 21 is fixed to the underside of the bottom 11 at or near the aft end. This fin 21 is fixed in its position, as shown, and the length and depth thereof is determined on the condition of the snow. For example, powdery snow would require a relatively long and deep fin 21 while hard packed snow would require a somewhat shorter fin with less depth. The function of fin 21 is to insure that while coasting, the aft end always trails the forward end. So far, the toboggan is similar to prior art toboggans except that in U.S. Pat. Nos. 2,677,551 and 3,579,682 each teach a pivotable fin at the aft end for steering the toboggan.

My toboggan, however, has a novel steering means which allows a sharper turn and better control of the toboggan, thus eliminating a preformed toboggan run. The steering means consists of a pair of drag panels 31 and 32 shaped, preferably as shown in FIG. 2. Each panel 31 and 32 is suitably hinged to the aft rail 17 by a hinge such as 33, which has its rotational axis in the plane of the bottom 11. The hinge 33 allows the panels to rotate about a transverse axis so that the panels can be lifted out of the snow, as shown in FIG. 1, and lowered into the plane of the bottom 11, as shown in FIG. 2. To provide drag, the underside of each panel 31 and 32 is provided with one or more spikes 34 which are capable of engaging the snow when the respective panel is pivoted down to its longitudinal position. Again, like fin 21, the shape and size of spikes 34 depend on the type of snow one is coasting on. Therefore, like fin 21, the spikes 34 are preferably mounted so they are removable, but they are fixed in place and rigid when one is coasting. To allow for easy operation of panels 31 and 32, I have provided a linkage means to a pair of foot pedals 41 and 42 (FIG. 3) located at the forward end. Each pedal 41 and 42 is suitably hinged by hinges 43 to bottom 11, while the top portion presses against an arm 44a of a rocking link, which is shown shaped as a modified letter "W." The rocking link has a horizontal axle portion 44b which passes through a suitable opening 45 in an L-shaped bracket 46 which, in turn, is fixed at one end to bottom 11 and at the other to respective sides 15 and 16. The rocking link is capable of pivoting about an axis defined by portion 44b. Vertical arm 44c on the rocking link is pin-connected to a respective longitudinal rod 48 (FIG. 1) which has an upturned vertical portion at its aft end. The aft end of rod 48 is pin-connected to a link 49, which is, in turn, pin-connected to respective panels 31 and 32. Suitable springs, not shown, are used to maintain the panels 31 and 32 in their raised position. Now one sees that to lower the respective panels 31 or 32, one needs only to press forward on the respective foot pedals 41 or 42. This causes the rocking link to pivot about portion 44b to cause rod 48 to move towards the aft end. Thereby, the respective panel is rotated to its horizontal position to allow the spikes 34 to dig into the snow. The forward end will turn to the right if the right foot pedal 42 is pressed, or to the left if the left foot pedal is pressed. The toboggan is stopped or slowed down by pressing both foot pedals.

Now when one turns the toboggan to traverse the hill or to travel a horizontal course, even though the sled is on a hillside, I have provided forward or front stabilizing fins 51. Although only one fin 51 would, under most conditions, be beneficial, I have chosen to use a pair of fins 51. One sees that when the fins 51 are in the position as shown in FIG. 5, the front end of the sled would not tend to go down hill when one is attempting to traverse the hill. The fins are fixed at one end to an axle 52 which is bearing mounted to suitable bearing pads 53 mounted to the underside of the curved portion 12. At the forward end, the fins 51 are connected together by a rod 54, to which is pin-connected a push rod 55 that extends up into the toboggan through a hole in the curved portion 12. The other end of push rod 55 is pin-connected to the upper end of a rocker arm 57 which rocks about its midpoint on a horizontal axis and on a pad 58, fixed to the interior of the curved portion 12. The lower end of the rocker arm 57 is pin-connected to a link 59 which has its other end pin-connected to a lever 60 which in turn is suitably pin-connected at its lower end to bottom 11. To keep the fins 51 in their raised position, I have employed a tension spring 61 acting between rocker arm 57 and the link 59, as shown. FIG. 4 shows the spring 61 in its shortened condition while FIG. 5 shows the spring 61 in its extended position or under tension. Then whenever the operator desires to have the fins 51 engage the snow, he merely pulls back on lever 60. When he lets go the lever 60 rotates forward due to the action of spring 61 and rotates out of the way to rest in a substantially horizontal position, if one prefers.

Having described the preferred embodiment of my invention one skilled in the art, after studing the above description, can devise other embodiments without departing from the spirit of my invention. Therefore my invention is not to be considered as limited to the disclosed embodiment, but includes all embodiments falling within the scope of the appended claims.

I claim:

1. A toboggan comprising:
   a body with a flat bottom capable of sliding on snow and with a curved forward portion;
   said body having an aft rail disposed transversely and at the rear end thereof;
   a rear stabilizing fin disposed on the underside of said body;
   a pair of drag panels hinged at said aft rail of said body and disposed to pivot independently about a transverse axis disposed parallel to said bottom;
   each of said drag panels being disposed rearward of said body and having a flat bottom which is capable of being pivoted into the plane of said bottom of said body;
   first means disposed on said flat bottom of each of said panels and protruding therefrom; and
   second means disposed within said body for independently pivoting each one of said panels about said axis.

2. The toboggan of claim 1 wherein:
   at least one front stabilizing fin is disposed under said curved portion of said body; and
   third means are provided for lowering said front fin down below said flat bottom of said body and for raising said front fin above said flat bottom.

3. The toboggan of claim 2 wherein said second means comprises:
   at least one food pedal disposed within said body and pivotably mounted at its lower edge to said body;
   a rocking link disposed substantially vertically and mounted to said body so that said link pivots about a horizontal axis disposed between its upper and lower ends;
   a horizontally disposed rod, pin-connected to the lower end of said link by its forward end;
   fourth means for coupling said rod at its aft end to one of said panels;
   said upper end of said link disposed to make contact with said foot pedal.

4. The toboggan of claim 3 wherein said rocking link comprises:
   a horizontal arm fixed at its upper end and disposed to make contact with said foot pedal;
   a horizontal axle disposed between its upper and lower ends;
   fifth means for bearing mounting said axle and disposed fixed to said body so that said link pivots about said axle.

5. The toboggan of claim 4 wherein said fourth means comprises:
   a vertical turned up end fixed to said rod;
   a first link, pin-connected by one end to said turned up end and pin-connected by the other end to said panel.

6. The toboggan of claim 5 wherein said third means comprises:
   a transverse rod rotatably mounted to the underside of said curved portion;
   said front fin having an elongated form and fixed by its aft end to said transverse rod;
   said curved portion having an opening above said transverse rod;
   an arm, pin-connected to the forward end of said front fin and protruding into said opening;
   a second linkage disposed longitudinally and pin-connected by its forward end to said arm;
   a lever, pin-connected to the inside of the bottom of said body;
   said second linkage is pin-connected by its aft end to said lever.

7. The toboggan of claim 1 wherein said second means comprises:
   at least one foot pedal disposed within said body and pivotably mounted at its lower edge to said body;
   a rocking link disposed substantially vertically and mounted to said body so that said link pivots about a horizontal axis disposed between its upper and lower ends;
   a horizontally disposed rod, pin-connected to the lower end of said link by its forward end;
   fourth means for coupling said rod at its aft end to one of said panels;
   said upper end of said link disposed to make contact with said foot pedal.

8. The toboggan of claim 7 wherein said rocking link comprises:
   a horizontal arm fixed at its upper end and disposed to make contact with said food pedal;
   a horizontal axle disposed between its upper and lower ends;
   fifth means for bearing mounting said axle and disposed fixed to said body so that said link pivots about said axle.

9. The toboggan of claim 3 wherein said fourth means comprises:
   a vertical turned up end fixed to said rod;
   a first link, pin-connected by one end to said turned up end and pin-connected by the other end to said panel.

* * * * *